(No Model.) 2 Sheets—Sheet 1.
E. S. GEROW.
CULTIVATOR AND WEED CUTTER.
No. 463,352. Patented Nov. 17, 1891.

Witnesses,
J. H. Nourse
H. F. Ascheck

Inventor,
Edward S. Gerow.
By Dewey & Co.
Atty.

(No Model.) 2 Sheets—Sheet 2.

E. S. GEROW.
CULTIVATOR AND WEED CUTTER.

No. 463,352. Patented Nov. 17, 1891.

Witnesses:

Inventor,
Edward S. Gerow,
By Dewey & Co.
Attys

UNITED STATES PATENT OFFICE.

EDWARD S. GEROW, OF LAFAYETTE, ASSIGNOR OF ONE-HALF TO CALVIN L. MAXWELL, OF OAKLAND, CALIFORNIA.

CULTIVATOR AND WEED-CUTTER.

SPECIFICATION forming part of Letters Patent No. 463,352, dated November 17, 1891.

Application filed March 25, 1891. Serial No. 386,384. (No model.)

*To all whom it may concern:*

Be it known that I, EDWARD S. GEROW, a citizen of the United States, residing at Lafayette, Contra Costa county, State of California, have invented an Improvement in Cultivators and Weed-Cutters; and I hereby declare the following to be a full, clear, and exact description of the same.

My invention relates to certain improvements in apparatus for cultivating the soil.

It consists in certain details of construction, which will be more fully explained by reference to the accompanying drawings, in which—

Figure 1:
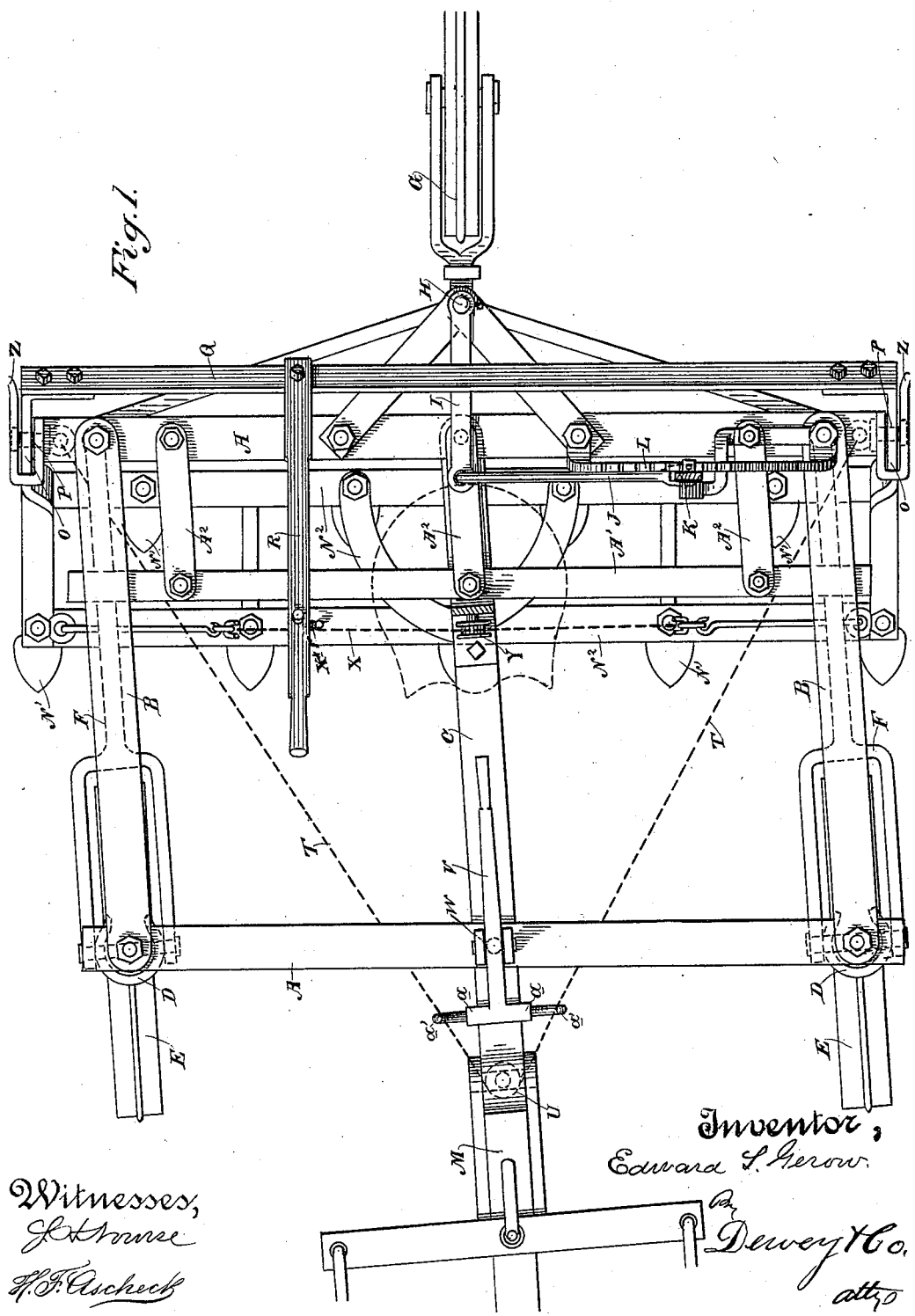
Figure 2:
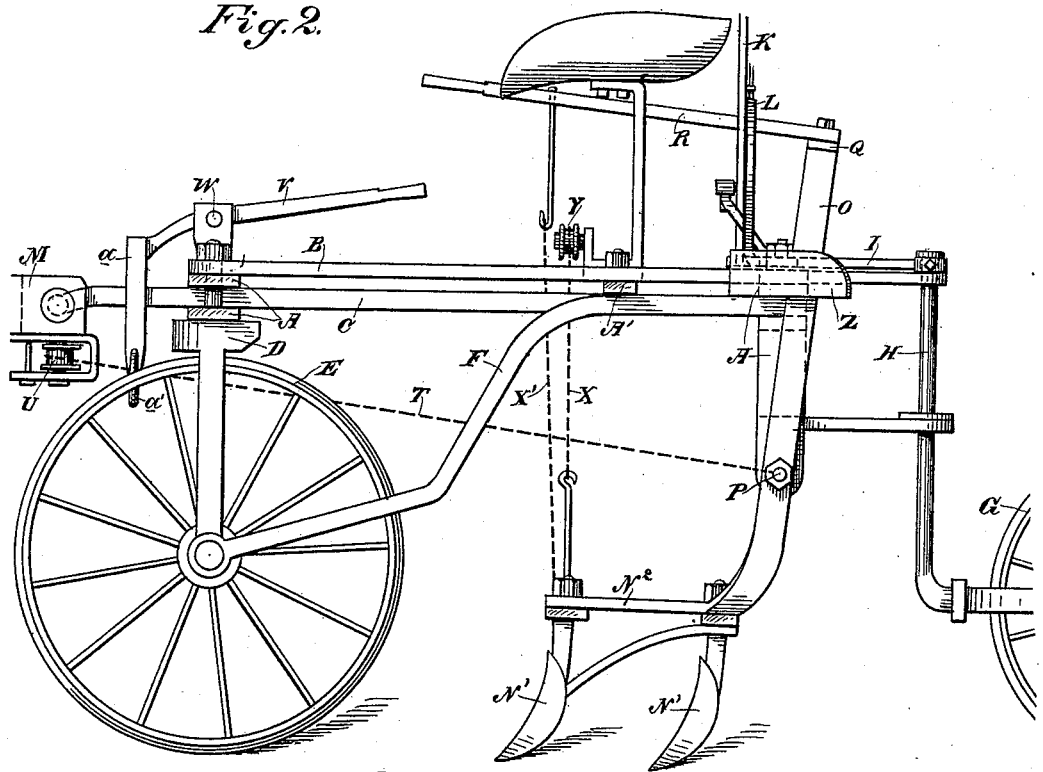
Figure 3:
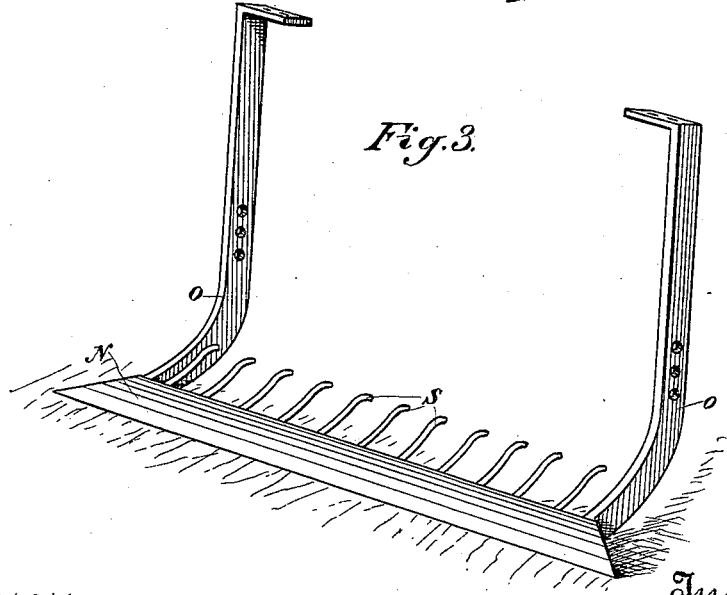

Figure 1 is a plan view of my machine. Fig. 2 is a side elevation. Fig. 3 shows the weed-cutting blade.

This apparatus is designed especially to eradicate weeds and to loosen up and cultivate the ground; and it consists of a frame-work loosely pivoted together, so that the parts may be shifted with relation to each other similarly to those of a parallel ruler, and by this construction the cutting-blade or cultivator may be thrown to one side or the other of the main frame, so as to reach parts of the ground at a considerable distance therefrom.

The main frame consists of two parallel transverse bars A, connected together by the two parallel bars B, which are pivoted to the bars A, so that when they stand at right angles with each other they form a rectangular frame. This frame-work, as shown in the present case, is made of iron, and the front and rear bars A consist of upper and lower plates for the purpose of rendering the frame as stiff and rigid as possible. The two bars B B are pivoted to the top of the frames A, and an intermediate or central bar C is pivoted between the two parts of the frames A and parallel with the outer bars B.

In order to insure a greater stiffness and rigidity to the frame, I have shown a bar A', which extends across between the bars B parallel with the bars A, and the ends of this bar are united with the rear bar A by the short connecting-bars $A^2$. The pivotal joints of these connected bars are sufficiently loose to allow the frame to be turned to one side or the other, so that it may be in the form either of a parallelogram or a rhomboid.

At the front and at each of the outer ends of the front bars A, and approximately at the junction of this bar with the side bars B, is mounted a frame or fifth-wheel D, carrying the standard of the bearing-wheel E, which supports the front of the machine and allows the frame to move easily over it when turned to one side or the other. These wheels and their standards are suitably stiffened by the braces F, which extend rearwardly and connect with the rear portion of the frame A, as shown.

In the center and behind the rear bar A is journaled the caster or swivel wheel G, having the standard H extending upward through suitable journal-boxes attached to the frame, as shown. Upon the upper end of this standard is a lever I, and this lever is connected by a link J with the lower end of a lever K, which is suitably fulcrumed upon the frame. By moving this lever to one side or the other transversely across the machine the connecting devices act to turn the swivel-wheel to one side or the other, and by this means the frame may be turned to any desired point. The lever K is held at any desired position by means of a pawl and a rack L of the usual construction for such devices. The pole M is hinged to the front central portion of the frame, so as to have a movement up and down independent of the movement of the frame, and the horses are connected therewith by the usual doubletree and hauling devices.

My weed-cutter consists of a blade N of sufficient length to extend entirely across the rear portion of the frame. It is supported upon arms O, to the lower ends of which it is securely fixed. These arms are fulcrumed or pivoted at P to the lower portion of the frame A, this bar of the frame being bent downward at right angles at each side, as shown, so as to form a pivotal support and fulcrum for the arms O of the cutting-blade. The upper ends of these arms are connected by bolts with the cross-bar Q, and to this cross-bar is attached an arm R, which extends forward to a point in front of the driver's seat, so as to be within easy reach. By means of this lever the frame Q may be swiveled about the fulcrumed points P, so as to throw the cultivator blade or teeth into such position that they will cut deeper or more shallow, as may be needed.

When the single blade N is used simply as a weed-cutter, fingers S extend rearwardly from its upper rear edge, and these fingers serve to lift the weeds which are cut, while the dirt flows over the rear edge of the blade and falls back into place, the weeds being deposited upon the top of the dirt, where they are in position to be killed by the heat of the sun.

In order to brace and support the arms O, which carry the cultivator or weed-cutter, I have shown the chain T, attached to these arms near their fulcrum-points P and extending forward to a point just behind and beneath the rear end of the pole, where the chain passes around a pulley U, this pulley serving as the point against which the strain is brought when the machine is being drawn forward; but it allows the frame to turn freely to any angle, as previously described, the chain simply moving around the pulley as the latter is moved from one side to the other, but always maintaining a pulling tension upon the frame O.

The pole M is pivoted to the front of the machine, as previously described. Upon each side of the rear end of the pole or its connection with the front of the frame are the vertically-sliding bars a, having the upper end connected with a lever V, which is fulcrumed at W upon the front of the frame. At the lower ends the bars a are bent into hooks a', standing behind the pulley U, so that the chain T passes through these hooks between the pulley and the points of attachment to P. Whenever the frame A B is turned to either side or straight to the front, the chain moves around the pulley U, and when the frame is in the desired position it is locked by drawing up the hooks a' by means of the lever V until they bind upon and lock the chain, and through it the loosely-jointed frame.

For certain kinds of cultivating the single blade N, having a sharpened front edge throughout its whole length, may be employed, and for others independent or separate cultivator-teeth N' are secured to the lower part of a frame, which is made as shown at N² to have sufficient strength and surface for the attachment and proper bracing of these independent teeth. The arms O are connected with this frame in the same manner as they are with the blade N fulcrumed at P, and have their upper ends united by the transverse bar Q, this part being exactly as before described.

In order to resist the strain which is brought upon this frame and cultivator in a vertical direction, I have shown the chain X, connected with the front of the frame N², passing up over a pulley Y, and a second chain X' is connected with the lever R, so as to raise or depress the front of the cultivator, as previously described.

In order to steady the side bars O of the cultivator, I have shown the U-shaped guides Z attached at each end of the rear main frame A, so that the arms O extend up between the sides of these guides, and are thus prevented from side oscillations or strains.

It will be manifest that by turning the caster-wheel G so as to throw the frame into a rhomboidal form, as shown in Fig. 1, one end of the cultivator will be thrown a considerable distance outside of the main frame and locked in this position by the chain T and hooks a', and by these means it may be made to cultivate close up to vines or trees and in places where overhanging branches would not allow the team to be driven sufficiently close for the purpose with an ordinarily-constructed cultivator.

Having thus described my invention, what I claim as new, and desire to secure by Letters Patent, is—

1. In a cultivator and weed-cutter, the main frame loosely jointed together in the form of a parallelogram, having the cultivator attached to the rear portion, wheels upon which the front end of the frame is supported, and a steering swivel-wheel supporting the rear of the machine, together with a device whereby said wheel may be turned and the frame thrown into the form of a rhomboid, with the rear acute angle thrown to either one side or the other of the center, substantially as herein described.

2. In a cultivator, the loosely-jointed frame forming a parallelogram, wheels upon which the front end of said frame is supported, a swivel-wheel supporting the rear of the frame, levers whereby said wheel may be turned, so as to throw the frame to one side or the other, and circular fifth-wheel supports interposed between the standards of the front wheels and the frame, whereby the latter may move freely upon said standards, substantially as herein described.

3. In a cultivator, the loosely-jointed frame adapted to form a parallelogram or rhomboid, wheels supporting the front and a swivel-wheel supporting the rear, with means for turning said wheel, so as to change the form of the frame, a cultivator or weed-cutter having suspending arms extending upwardly and fulcrumed to the main frame, a chain connected with these arms near the fulcrum-points, and a pulley fixed to the top and front of the main frame, around which the chain passes and by which the strain of the draft is transferred to the front of the frame, while the latter is allowed to change its shape by reason of the chain moving freely around the pulley, substantially as herein described.

4. In a cultivator, the frame pivoted together so as to form a parallelogram or rhomboid at will, a cultivator mounted upon a frame, having arms extending up at each side of the main frame and pivoted thereto, a chain connected with the cultivator and with a lever, by which the cultivator may be raised or depressed about the fulcrum-points of its frame to change the angle and depth of the cut, substantially as herein described.

5. In a cultivator, the main frame swiveled together, mounted upon front bearing and rear steering wheels, devices whereby the rear wheel may be turned and the shape of the frame changed about its joints, a supplemental frame carrying the cultivator and having upwardly-extending side arms fulcrumed to the main frame, a lever and connecting devices whereby the supplemental frame may be turned about its fulcrum-points, and guides Z, within which the side arms move and by which they are prevented from side shake, substantially as herein described.

6. In a cultivator, a main frame swiveled together, mounted upon front bearing and rear steering wheels, devices whereby the rear wheel may be turned and the shape of the frame changed about its joints, a supplemental frame carrying a cultivator and suspended from upwardly-extending side arms fulcrumed to the main frame, chains extending from these side arms around a pulley at the front of the machine, a lever and vertically-moving bars actuated thereby, with hooks through which the chain passes and by which it is locked at any position of the frame, substantially as herein described.

In witness whereof I have hereunto set my hand.

EDWARD S. GEROW.

Witnesses:
S. H. NOURSE,
H. F. ASCHECK.